May 26, 1959 P. PALLUEL 2,888,598

DELAY LINES

Filed Jan. 3, 1956 6 Sheets-Sheet 1

May 26, 1959 P. PALLUEL 2,888,598

DELAY LINES

Filed Jan. 3, 1956 6 Sheets-Sheet 4

May 26, 1959 P. PALLUEL 2,888,598

DELAY LINES

Filed Jan. 3, 1956 6 Sheets-Sheet 5

DELAY LINES

Filed Jan. 3, 1956 6 Sheets-Sheet 6

United States Patent Office 2,888,598

Patented May 26, 1959

2,888,598

DELAY LINES

Pierre Palluel, Paris, France, assignor to Compagnie Generale de Telegraphie Sans Fil, a corporation of France Application January 3, 1956, Serial No. 557,022

Claims priority, application France December 19, 1952

21 Claims. (Cl. 315—3.6)

This application is a continuation-in-part of the application Serial No. 397,617, filed December 11, 1953.

The present invention relates to delay line structures. It is an object of the invention to enable, in such lines, interaction of a plurality of electron beams with an electromagnetic wave propagating therein. As is well known, delay lines are used in traveling wave oscillators and amplifiers. The use of the delay line of the invention makes it possible to increase the output of such tubes.

The delay line according to the invention comprises at least one metal base supporting an array of identical, finger-shaped elements, extending in a direction perpendicular to said base and having, in said direction, a dimension substantially equal to a quarter wave-length, in free space, in the center of the pass-band of said delay line, these elements being aligned in parallel, equally spaced rows, along two directions perpendicular to each other.

According to a first preferred embodiment of the invention, the elements of the delay line are placed in a staggered arrangement.

According to another embodiment, the elements of the delay line have enlarged free ends.

According to a further embodiment of the invention, the elements of the delay line are connected by straps. In the direction perpendicular to the direction of propagation of the electron beams, the odd elements of a row and the even elements of the adjacent row are connected to a strap, and the straps are connected by pairs.

In the following specification, the term "harrow" will be, for convenience, used to designate a finger-carrying base. In most cases, to build a delay line, two such harrows are used, one finger of one harrow extending between two fingers of the other, without, however, touching the base to which these latter fingers are secured.

A beam of electrons can be propagated in each channel defined by two adjacent rows of fingers. In certain cases, however, these beams will be propagated above these channels, for instance when only one harrow is used for building a delay line.

The invention will be better understood from the following description, with reference to the appended drawing, in which.

Figures 16, 18:
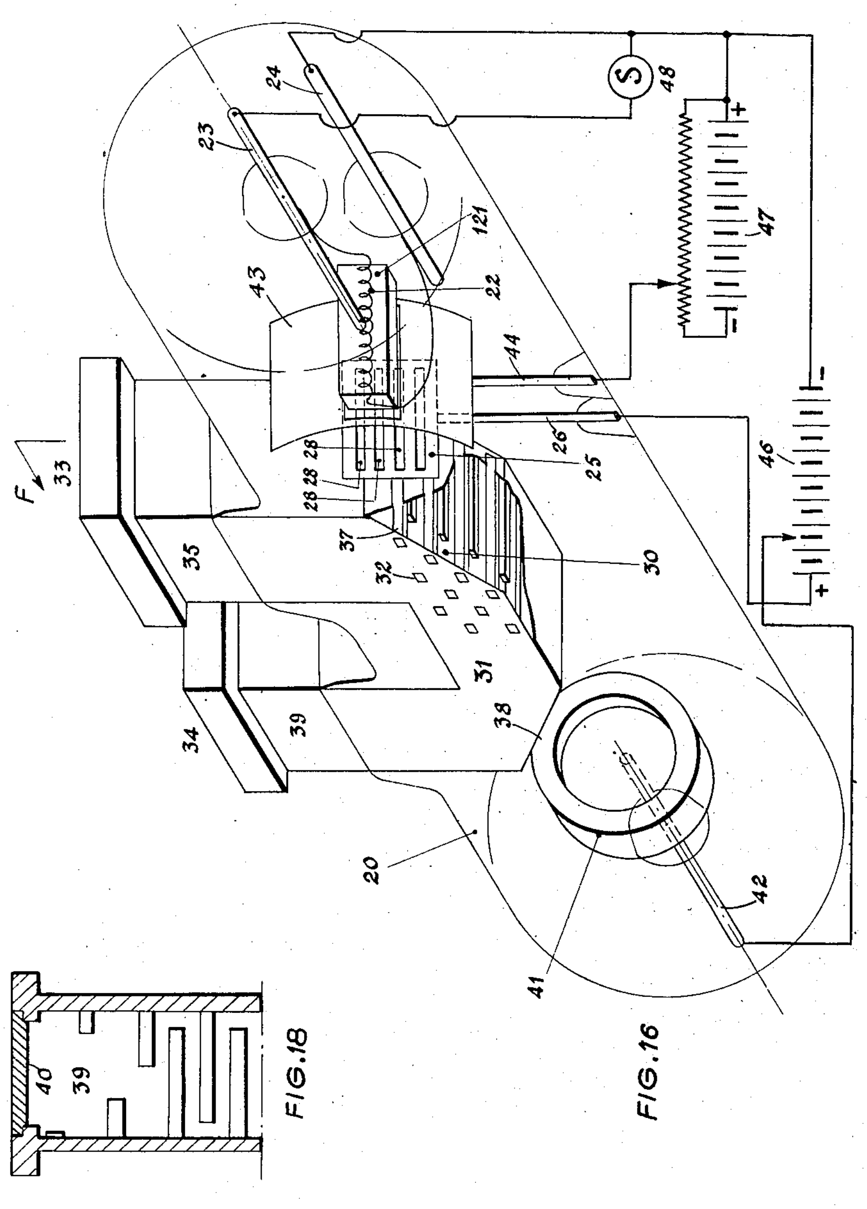
Figure 17:
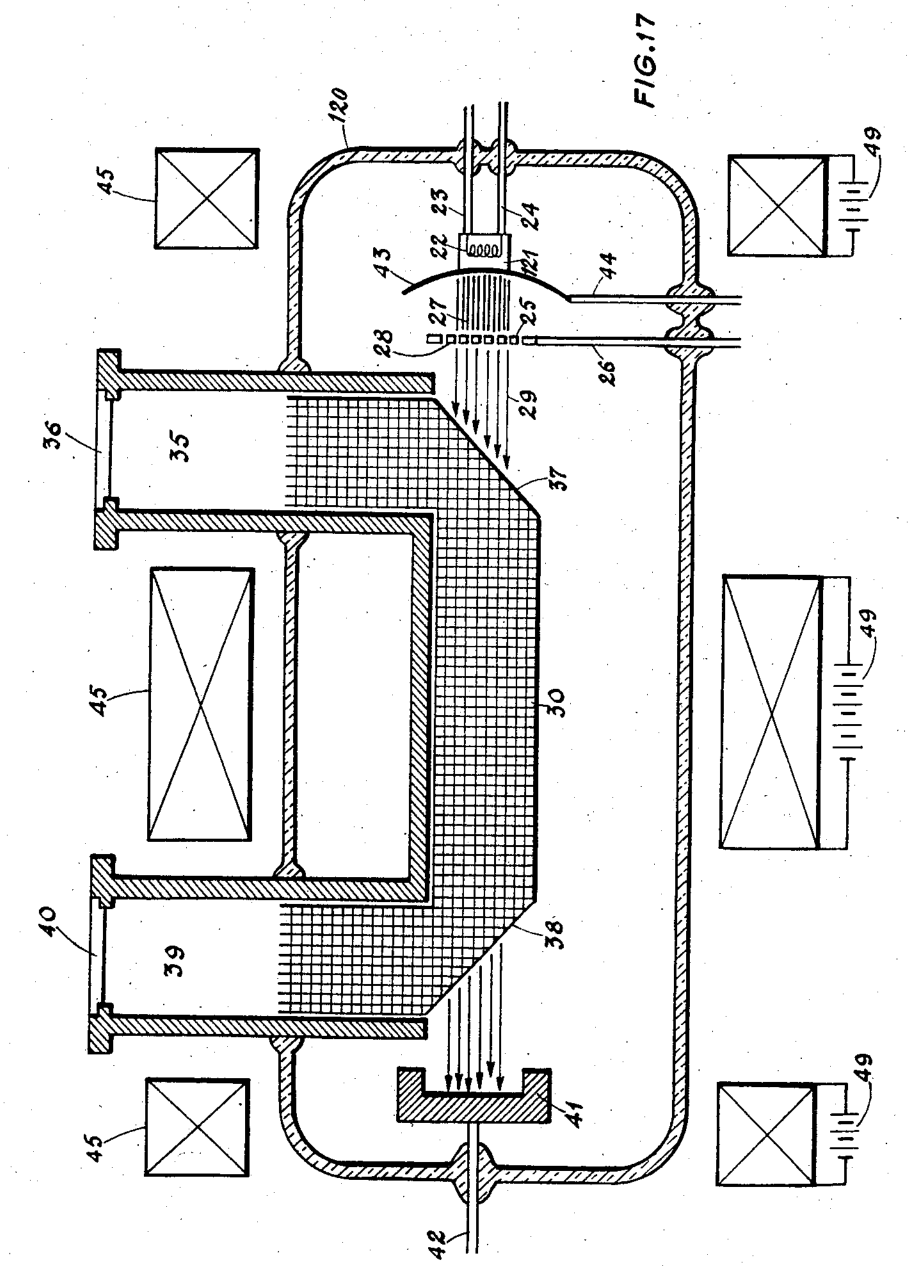

Figures 9 to 15 inclusive show in perspective further modifications of the invention;

Figure 16 is a perspective view, partially broken off, of a traveling wave tube, with a delay line according to the invention;

Figure 17 is a diagrammatic section of the tube of Figure 16 through its longitudinal plane of symmetry.

Figure 18 shows a cross-section through plane F of part of the tube represented in Figure 16.

In all the figures, the same references designate the same elements.

Figures 1, 2, 3, 4:
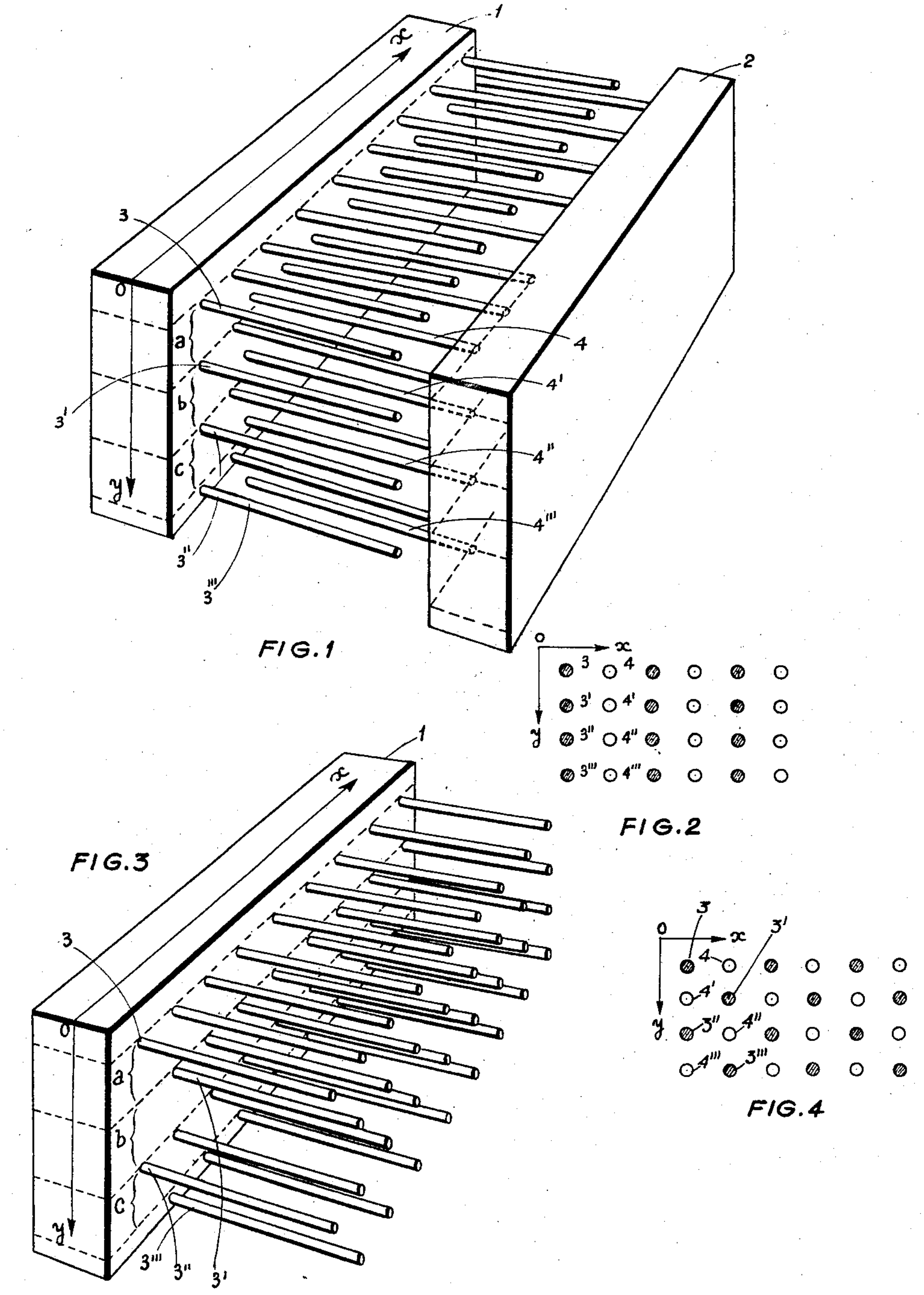
Figure 1 is a perspective view of a first embodiment of the invention.
Figure 2 is an explanatory diagram relating to the embodiment of Figure 1.
Figure 3 shows a perspective view of a modified form of the line of Figure 1.
Figure 4 is an explanatory diagram relating to Figure 3.

According to the embodiment shown in Figure 1, two plane metal plates, or bases, 1 and 2 of uniform thickness support respectively metal fingers 3, 3′, 3″, 3‴ and 4, 4′, 4″, 4‴ shaped as cylindrical bars and normal thereto.

These bars are secured to their respective bases in any known manner, i.e. by brazing, screwing etc. The arrangement formed by a base and its fingers, i.e. a harrow, may be manufactured by machining, moulding, or otherwise. The fingers have a length substantially equal to a quarter wavelength, in free space, corresponding to the centre of the pass band for which the delay line is constructed. These bars form parallel and equally spaced rows, in the directions O*x* and O*y*. Bases 1 and 2 are parallel and the fingers suported by one base extend between two fingers supported by the other base without the bars supported by one base touching the other base, i.e. the fingers are interdigitated.

Figure 2, which is a partial cross section of Figure 1 through a plane parallel to the bases and comprised between them, clearly illustrates the respective position of the bars supported by each base. The fingers carried by base 1 are represented by hatched circles whereas those carried by base 2 are represented by plain circles. The delay line portion of Figure 2 may thus be considered as built up by a plurality, six in the present case, of comb shaped delay lines extending in the direction O*y*. The same fingers form, in the direction O*x*, another plurality, four in the present case, of interdigital delay lines. Three parallel propagation channels in the O*x* direction and five propagation channels in the O*y* direction are thus available inside the delay line portion of Figure 2.

In certain practical applications, it may be interesting to make use of a delay line which would behave like a plurality of parallel interdigital delay lines, both in the O*x* and in the O*y* directions. This is especially the case when it is desired to ensure a good propagation in a sufficiently wide band, not only in the O*x*, but also in the O*y* direction.

Figure 3 represents a metal base 1 carrying metal bars 3, 3′, 3″, 3‴ in staggered or checkerwise arrangement and Figure 4 shows, in the same way as Figure 2, the relative position of the fingers respectively supported by the two bases 1 of a delay line built up by two harrows, such as shown in Fig. 3. It will be readily seen from Figure 4 that the rows of fingers build up elementary interdigital delay lines, both in the O*x* and in the O*y* directions.

Such lines as shown in Figures 2 and 4 may be termed "two-dimensional delay lines."

Figure 5:
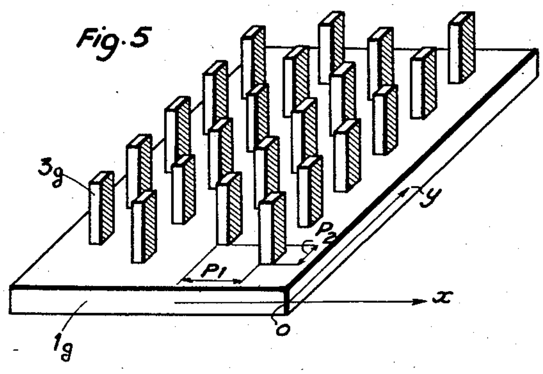
Figure 5 is a perspective view of another embodiment of the invention.

Figure 5 represents a modification of Figure 1, wherein the fingers $3_g$ secured to a metal plate $1_g$ have the shape of parallelepipedic vanes or baffles with a rectangular base, the dimension of the long side of the rectangle being two to two and a half times its small side. A two-dimensional interdigital delay line may be built by combining two structures identical to that of Figure 5, in the same way as indicated in connection with Fig. 3. The accurate determination of the distinctive features of the delay line depends on the dimensions of metal bars $3_g$ as well as on the spacings $P_1$ and $P_2$ of two successive rows, respectively, in the $Ox$ and $Oy$ directions.

Figure 6:
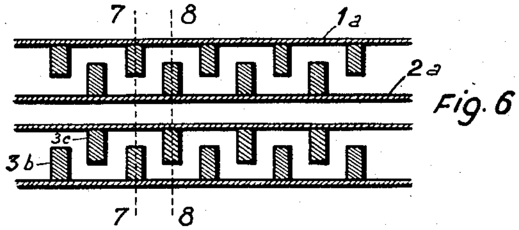
Figures 6 to 8 show, respectively, in longitudinal cross-section through a plane of symmetry, and, in cross-sections through planes 7—7 and 8—8 of Figure 6, an interdigital delay line derived from the line of Figure 3, but having a cylindrical base.
Figure 7:
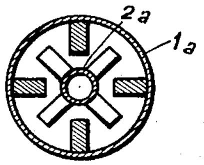
Figure 8:
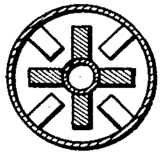
Figure 9:
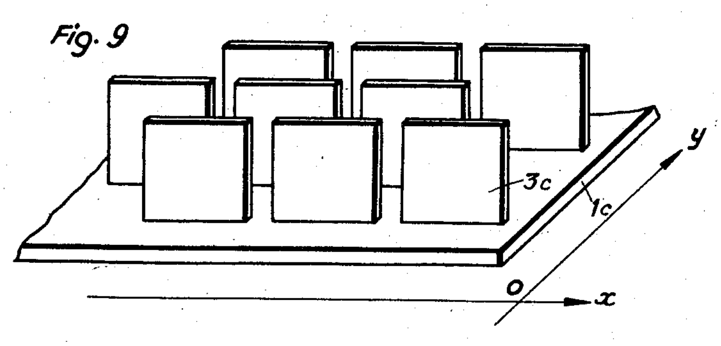

Figure 6, of which Figures 7 and 8 are cross-sections taken along planes 7—7 and 8—8 of Figure 6 respectively, illustrates an interdigital line, the bases $1_a$ and $2_a$ of which are constituted by two coaxial cylinders. Fingers $3_b$ and $3_c$ are carried by base $1_a$ and base $2_a$ respectively. The fingers are disposed on their respective bases in a staggered arrangement, as shown in Figures 7 and 8. In the case illustrated, eight radially arranged rows of elements, define eight propagation channels for elementary beams, propagating in a direction parallel to the axis of the system. Fig. 9 shows a delay line with staggered fingers in the shape of solid plates $3_c$, disposed in rows parallel to the direction $Ox$. Such a line may be used with flat beams propagating parallel to plate $1_c$ in the vicinity of the upper edge of the plates. Because of its massive shape, this line ensures a good dissipation of heat.

Figures 10, 11, 12:
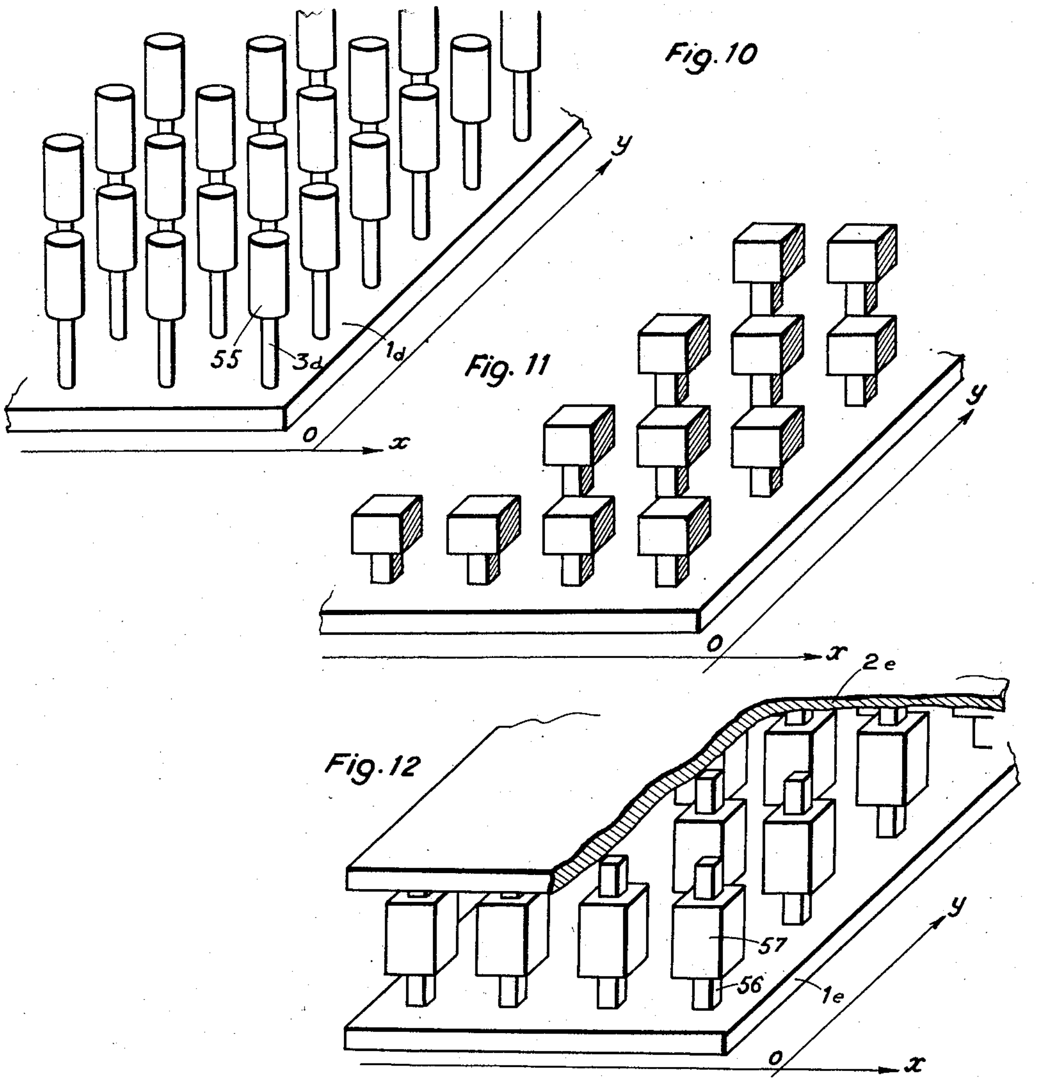

Figure 10 shows a delay line having cylindrical fingers $3d$, arranged in parallel rows on a base $1_d$ both in the $Ox$ and in the $Oy$ directions and having enlarged free ends 55.

In Figure 11, which is a modification of Figure 10, the fingers are parallelepipedic.

Figure 12 shows a delay line formed by superimposing two lines of Figure 11. In this case, the line has two parallel plane bases $1_e$ and $2_e$. These bases carry fingers 56, the length of which is substantially equal to a half wavelength, in free space, in the center of the pass band of the delay line. These fingers have an enlarged portion 57 about their centers.

Figure 13:
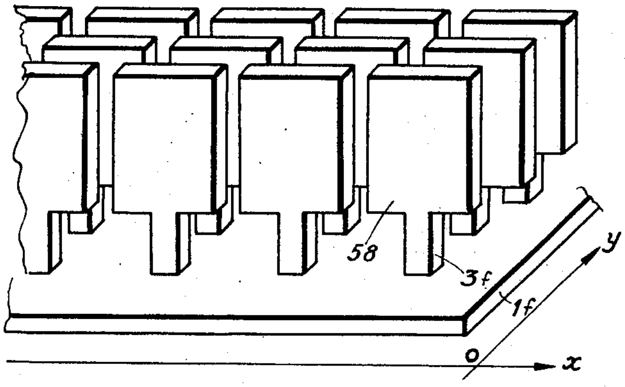

Figure 13 shows a delay line wherein the fingers $3_f$, supported by a base $1_f$, have a square section and carry parallelepipedic enlarged portions 58, with a rectangular cross-section, one of the dimensions of the rectangle being several times the other.

Figure 14:
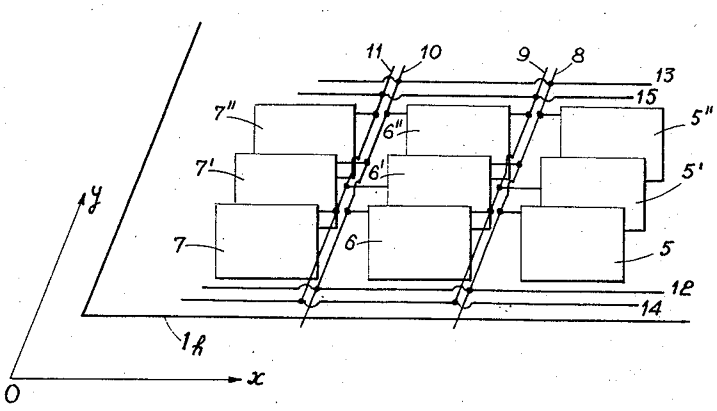

Figure 14 shows diagrammatically another embodiment of the delay line according to the invention, comprising base $1_h$ and fingers 5, 5', 5'', 6, 6', 6'', 7, 7', 7''. The fingers are metal plates having substantially the same dimensions as those in Figure 9, and form parallel rows both in the $Ox$ and in the $Oy$ directions. Fingers 5, 6' and 5'' are connected to a strap 8, fingers 6, 5', 6'' to a strap 9, fingers 6, 7', 6'' to a strap 10 and fingers 7, 6', 7'' to a strap 11. Straps 8, 10, etc., on one hand, and straps 9, 11, etc., on the other hand, are connected in parallel, at their ends, respectively, by means of conductors 12, 13 and 14, 15. A bifilar line 12—14 at the inlet, and 13—15 at the outlet, is thus formed, allowing a signal to be fed at the inlet and collected at the outlet.

Figure 15:
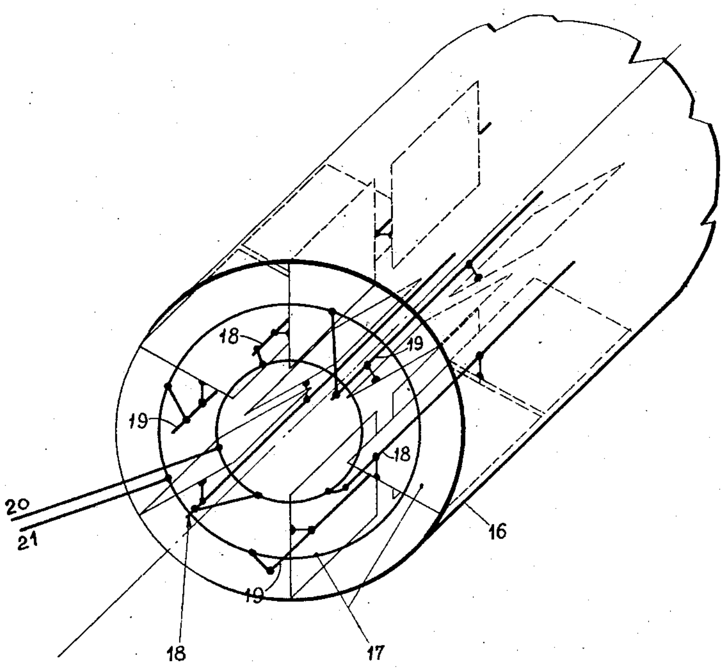

Figure 15 diagrammatically represents a structure similar to that of Figure 14. The base of the delay line is formed by a hollow metal cylinder 16, inside of which and perpendicular to which metal plates 17 are radially arranged, in uniformly spaced rows. All plates of the same row are strapped together by means of conductors, alternately numbered 18 and 19. Straps 18 are connected in parallel, on the one hand, and straps 19, on the other hand. A bifilar line 20—21 is thus obtained allowing a signal to be fed to or abstracted from the delay line, only one end of which has been shown. The other end may be arranged in a similar way.

Figure 16 is a perspective view, and Figure 17 an axial cross section, of a traveling wave tube having an envelope 120 (Figure 17) and provided with a delay line according to the invention of the interdigital type. Cathode 121 is heated by a filament 22 having terminals 23 and 24. A control electrode 43, in the shape of a portion of a cylinder, focuses a beam 27 (Figure 17), produced by cathode 121 and accelerated by anode 25. The latter is provided with openings 28, dividing the beam 27 into elementary beams 29, which follow the spacings comprised between the rows of fingers of a delay line 30. Figure 16 shows one of the metal bases 31 supporting half of the staggered fingers 32. Electro-magnetic energy to be amplified is fed at the input 33 through a wave guide 35 and is collected at the output 34, after amplification. Guide 35 is closed by a window 36, (Fig. 17) transparent to electro-magnetic energy, which is successively reflected on planes 37 and 38, forming an angle of 45° with the common direction of the beams. The amplified electromagnetic energy goes out through a wave guide 39 closed by a window 40, transparent to electromagnetic energy. A collecting electrode 41 collects the electrons after passing through the delay line. Coils 45 surrounding envelope 120 provide a focusing magnetic field, the lines of force of which are parallel to the axis of the tube. Figure 16 shows the connections of the vacuum tube with the voltage sources controlling its operation: the beam accelerating voltage source 46 is entirely applied to the accelerating electrode 25, through connection 26, and in part only to collector 41 through connection 42. The cathode is at zero potential. A negative voltage source 47 is applied, by means of a potentiometer, to the Wehnelt or control electrode 43 through a connection 44. An alternating current source 48 feeds filaments 22 of the cathode by means of connections 23 and 24. Direct voltage sources 49 are applied to coils 45 (Fig. 17).

Figure 18 is a cross section of wave guides 35 and 39 by a plane passing through their axes and perpendicular to the plane of Figure 17. The length of the bars of the delay line is gradually reduced and the width of the line is so adjusted that the matching between the delay line and the wave guide should be as good as possible.

It is of course to be understood that the invention is not limited to the embodiments represented and described hereinabove and given only by way of example.

What I claim is:

1. A delay line for ultra high frequency waves comprising at least one elongated base having an array of perpendicularly extending members rigidly fixed thereto, each of said members having a free end and having a length between said base and said end substantially equal to a quarter wave length of the operating wave in free space, said members being aligned in parallel rows, said rows being separated by intervals and extending in two mutually perependicular directions.

2. A delay line for ultra high frequency waves comprising: two spaced identical harrows, each comprising an elongated base having a plurality of perpendicularly extending members, checkerwise positioned thereupon and rigidly fixed thereto and having a length in the direction perpendicular to said base substantially equal to a quarter wave length of the operating wave in free space, said two bases being parallel to each other and said members being uniformly interdigitated along two directions normal to each other, the common length of said members being less than the distance comprised between said bases.

3. A delay line according to claim 2 wherein said members are vanes.

4. A delay line according to claim 1, wherein the members on each said base are in checkerwise relationship to each other.

5. A delay line according to claim 1, wherein said members are rods.

6. A delay line according to claim 1, wherein said members are parallelepipedic.

7. A delay line according to claim 1 comprising two elongated bases, wherein said elongated bases are coaxial cylinders.

8. A delay line as claimed in claim 1, wherein said members have enlarged free ends.

9. A delay line according to claim 8, wherein said members are cylindrical.

10. A delay line according to claim 8, wherein said members are parallelepipedic.

11. A delay line according to claim 8, wherein said members have a square section and have enlarged ends having a rectangular section.

12. A delay line according to claim 8, wherein said members have an enlarged middle portion.

13. A delay line as claimed in claim 1, further comprising, in each of said intervals, along at least one of said directions, a pair of strapping conductors having each an input and an output, a first of said conductors of each said pair separating a first and a second given row of said members being connected to all odd members of said first given row and to all even members of said second given row, and the second of said conductors being connected to all even members of said first given row and to all odd members of said second given row, all inputs and all outputs of said first and second conductors being respectively interconnected.

14. A delay line according to claim 1, further comrising in each of said intervals, along at least one of said directions, at least one strapping conductor connected to all said members of an adjacent row.

15. A delay line according to claim 14, wherein said base is cylindrical.

16. A delay line for ultra high frequency waves comprising: two identical members each comprising an elongated base having an array of extensions perpendicular to said base and constituting respectively along two directions perpendicular to each other at least three rows of extensions having perpendicularly to said two directions a length substantially equal to a quarter wave length of the operating wave in free space and, said extensions being spaced from each other along each of said directions by intervals extending over the whole of their respective opposed faces, said two members being positioned with their respective bases parallel to each other and with their respective extensions interdigitated in uniformly spaced relationship and the extensions of one member being spaced from the base of the other, whereby at least two linear channels are provided within said delay line.

17. A delay line for ultra high frequency waves comprising: a first and a second parallel elongated base, each base supporting an array of fingers normal thereto; each of said members having a free end and having a length between said base and said end substantially equal to a quarter wave length of the operating wave in free space, said members being aligned in parallel rows, said rows being separated by intervals and arrayed in two mutually perpendicular directions, the fingers of one base being interdigitated, along at least one direction common to all the rows, with the fingers of the other base.

18. A delay line according to claim 17, wherein said fingers of one base are interdigitated with said fingers of the other base along both said directions.

19. A traveling wave tube having an electron gun for emitting a plurality of parallel flat electron beams and a delay line comprising: at least one elongated base having a plurality of perpendicularly extending members rigidly fixed thereto, each of said members having a free end and having a length between said base and said end substantially equal to a quarter wave length of the operating wave in free space, said members being aligned in parallel rows, said rows being separated by intervals and arranged in two mutually perpendicular directions, whereby a plurality of parallel linear channels are provided, said gun being positioned for propagating each of said beams along a separate one of said channels.

20. A delay line for ultra-high frequency waves comprising at least one elongated base having an array of members rigidly fixed thereto and extending away from said base, each of said members having a free end and having a length between said base and said end substantially equal to a quarter wave length of the operating wave in free space, said members being aligned in parallel rows and said rows being separated by intervals and extending in directions forming an angle with one another.

21. A travelling wave tube having an electron gun for emitting a plurality of parallel flat electron beams and a delay line comprising at least one elongated base having a plurality of members rigidly fixed thereto and extending away therefrom, each of said members having a free end and having a length between said base and said end substantially equal to a quarter wave length of the operating wave in free space, said members being aligned in essentially parallel rows and said rows being separated by intervals and extending in directions forming an angle with one another, whereby a plurality of essentially parallel linear channels are provided, said gun being positioned for propagating each of said beams along a separate one of said channels.

References Cited in the file of this patent

UNITED STATES PATENTS

| | | |
|---|---|---|
| 2,653,270 | Kompfner | Sept. 22, 1953 |
| 2,657,329 | Wathen | Oct. 27, 1953 |
| 2,683,238 | Millman | July 6, 1954 |
| 2,683,256 | Kumpfer | July 6, 1954 |
| 2,745,984 | Hagelbarger | May 15, 1956 |
| 2,746,036 | Walker | May 15, 1956 |
| 2,802,135 | Dodds | Aug. 6, 1957 |